United States Patent [19]

Donley et al.

[11] Patent Number: 4,866,361

[45] Date of Patent: Sep. 12, 1989

[54] ACTUATOR RATE SATURATION COMPENSATOR

[75] Inventors: Shawn T. Donley, Horsham; Garry L. Gross, Feasterville; Judith L. Koper, Horsham, all of Pa.

[73] Assignee: The United States of America as represented by the Secretary of the Navy, Washington, D.C.

[21] Appl. No.: 204,152

[22] Filed: May 5, 1988

[51] Int. Cl.$^4$ .............................................. B64C 13/18
[52] U.S. Cl. .................................... 318/584; 318/566; 318/561
[58] Field of Search ........................ 318/584, 566, 561

[56] References Cited

U.S. PATENT DOCUMENTS 3,793,574 2/1974 Hamel ................................. 318/561
4,684,085 8/1987 Berwick, Jr. et al. ............... 244/178

Primary Examiner—William M. Shoop, Jr.
Assistant Examiner—Saul M. Bergmann
Attorney, Agent, or Firm—John M. O'Meara; Susan E. Verona

[57] ABSTRACT

A device for compensating for actuator rate saturation is disclosed. The device is an improvement to a servomechanism of the type wherein a command signal and a position feedback signal from a member being positioned are summed to produce an error signal for driving an actuator to position the member in accordance therewith. The improvement is a means for inverting the error signal when the ratio of the slope of the plot of the position feedback signal versus time to the slope of the plot of the command signal versus time is less than one and the polarity of the error signal is opposite to the polarity of the slope of the command signal, and the absolute value of the error signal is not increasing. Application of the invention to the flight controls of an aircraft is disclosed.

7 Claims, 2 Drawing Sheets

ACTUATOR RATE SATURATION COMPENSATOR

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

This invention relates generally to apparatus for compensating for actuator rate saturation in servomechanisms, and more particularly to such apparatus for use with flight control actuators.

With the advent of more and more high performance jet aircraft, actuator rate saturation, wherein a phase lag develops between changes in command to the actuator and response from the aircraft, is becoming an increasingly critical issue in the flight controls arena. Actuator rate saturation can occur due to limitations in the hydraulic system or the physical limitations of the actuator itself.

In hydraulic system design there is a trade-off between high flow rate and high pressure. At high dynamic pressure (q), when airspeed is greatest, a very high hydraulic pressure is required to overcome the large hinge moments and effectively control the actuators. Under this circumstance, the actuator piston should be designed to have a large crosssectional area, so as to reduce the hydraulic pressure level required. At low dynamic pressure, a large flow rate is required for actuator control due to reduced control surface effectiveness at low speeds. The large flow is especially critical in the power approach situation. If an actuator is designed to have a large piston area for high q situations, low q conditions can only be satisfied with the actuator operation at a very high rate.

High performance jet aircraft, particularly short takeoff and landing (STOL) designs, must operate in both the high q/supersonic and low q/power approach situations. As a result of these conflicting demands on the actuator, rate saturation can occur, causing a phase lag problem, which in turn causes poor flight control performance and, often, pilot induced oscillations (PIOs). Another situation often occurs in which the pilot utilizes many of his control surfaces simultaneously. This results in reduced hydraulic pressure, which can cause actuator rate saturation due to the hydraulic limits of the actuator itself.

SUMMARY OF THE INVENTION

It is therefore an object of the invention to compensate for the rate saturation of an actuator used to control the movement of a member.

It is a particular object to eliminate poor flight control performance by compensating for the rate saturation which can occur in a flight control actuator.

It is yet another object to reduce the occurrence of pilot induced oscillations in aircraft.

Briefly, these and other objects of the invention are accomplished by an improvement to a servomechanism for driving an actuator to control the position of a member, the servomechanism being of the type wherein a command signal and a position feedback signal from the member are compared to derive an error signal for controlling the actuator. The improvement comprises a means for inverting and sustaining inverted the polarity of the error signal when a ratio of the slope of the plot of position versus time (hereinafter "slope") for the position feedback signal to the slope of the command signal is less than one and the polarity of the error signal is opposite to the polarity of the slope of the command signal and the absolute value of the error signal is not increasing.

These and other objects, advantages, and novel features of the invention will become apparent from the following detailed description of the invention when considered in conjunction with the accompanying drawings wherein:

DESCRIPTION OF THE PREFERRED EMBODIMENT

Figure 1:
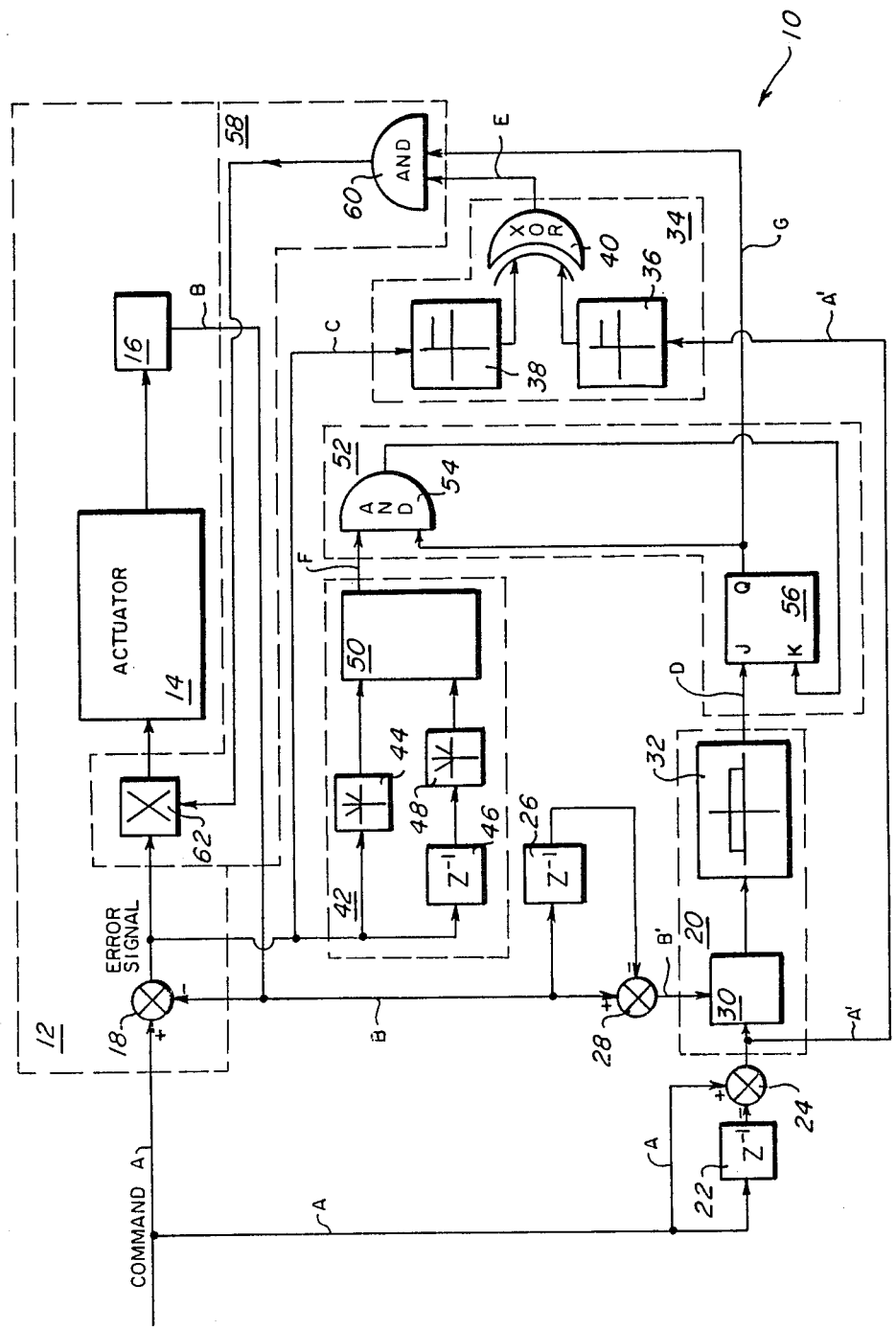
FIG. 1 is a block diagram of one preferred embodiment of the compensator of the present invention.

Referring now to the drawings wherein like characters designate like or corresponding parts throughout the several views, there is shown in FIG. 1 a compensator 10 of the present invention. It is shown in context with its use in a servomechanism 12, which includes an actuator 14, used to control the movement of a member 16. In such a conventional servomechanism 12, a command signal A inputs to a summer 18. A position feedback signal B from member 16 also inputs to summer 18, where it is summed with command signal A to produce error signal C, which in turn drives actuator 14. A typical application of such a mechanism would be in the flight control system of an aircraft, wherein the command signal A is the signal from the pilot's control input, actuator 14 is the hydraulic drive, and member 16 is one of the control surfaces on the aircraft. In such a flight control system, error signal C drives actuator 14 through a servovalve (not shown) which controls hydraulic flow to actuator 14.

Figure 2A:
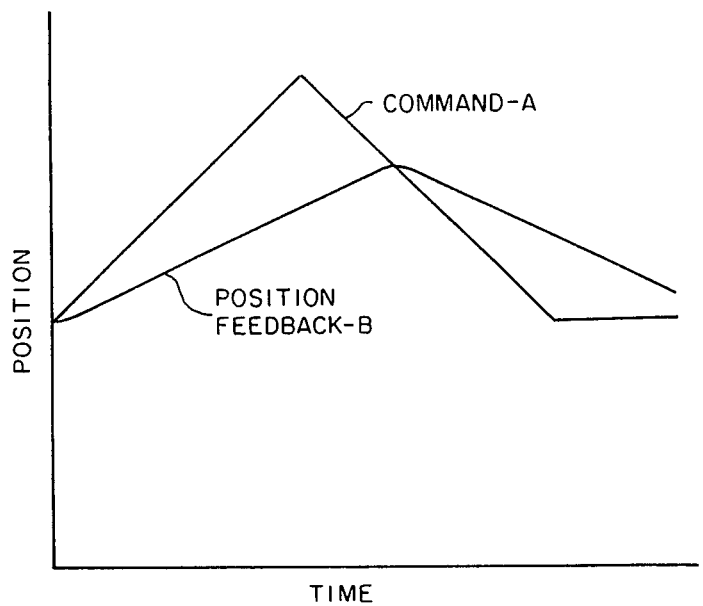
FIG. 2a is a graph of position versus time for an uncompensated, rate saturated servomechanism.

In a conventional servomechanism 12, the error signal C is indicative of the extent to which member 16 is not where the command signal A is directing it to be. Therefore, actuator 14, which is driven by error signal C, should be responding at the level necessary to move member 16 to the desired position. Under certain circumstances, however, servomechanism 12 becomes rate saturated and member 16 cannot track command signal A. This is shown in FIG. 2a, where the slope of the plot of the position feedback signal B versus time is less than the slope of the plot of the command signal A versus time. In this situation, member 16 will not change direction with the command as long as error signal C remains the same polarity. Actuator 14 will continue to move member 16 in the same direction under these circumstances in spite of a change in direction of command signal A, in an effort to drive the error signal C to zero. When error signal C does change polarity, shown on the graph of FIG. 2a as the point when command signal A and position feedback signal B intersect, position feedback signal B will change direction or slope.

Figure 2B:
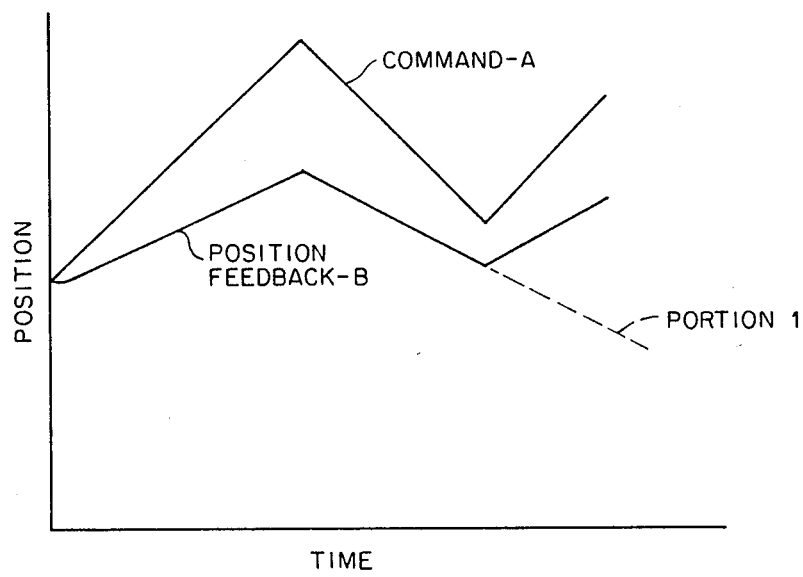
FIG. 2b is a graph of position versus time for a rate saturated servomechanism which is compensated according to the present invention.

Compensator 10 is designed to compensate for this failure of actuator 14 to track a change in direction of command signal A, or rate saturation. It does so by sensing when member 16 is traveling in the opposite direction to which it is being commanded to travel under circumstances of rate saturation, and inverts the polarity of error signal C to drive actuator 14 in the opposite direction. FIG. 2b, wherein the command and position feedback signals are plotted as functions of time, shows how servomechanism 12 operates when using compensator 10 of the present invention. The slopes referred to below are the slopes of these plots. Compensator acts to switch the polarity of error signal C and sustain it switched when a ratio of the slope of position feedback signal B to the slope of command signal A is less than one, and the polarity of error signal C is opposite to the polarity of the slope of command signal A. Additionally, the compensator 10 will only continue to operate when the absolute value of error signal C is not increasing. This last condition is present to prevent signals A and B from diverging, as shown in portion 1 of FIG. 2b.

FIG. 1 shows a schematic of a preferred embodiment of compensator 10. A slope ratio determining means 20 first determines when the ratio of the slope of position feedback signal B to the slope of command signal A is less than one and outputs a signal D indicative thereof. Signal D is enabling if the ratio is less than one, in which case compensator 10 is said to be armed. Inputs to slope ratio determining means 20 are signal A', which is indicative of the slope of signal A, and signal B', which is indicative of the slope of signal B. Signal A' is derived by passing signal A through first transfer function 22, which may be a discreet delay, and comparing the output therefrom to signal A via first summing junction 24. Signal B' is derived in the same manner using a second transfer function 26 and a second summing junction 28. Slope ratio determining means 20 may be an appropriately arranged operational amplifier 30 or any other well-known device capable of comparing B' and A', in combination with a limiter 32 for determining when the value from the operational amplifier is less than one.

Next, a polarity determining means 34 determines when the polarity of error signal C is opposite to the polarity of slope A' of command signal A, and outputs a signal E, indicative thereof. Signal E is enabling if C and A' are opposite in polarity, and non-enabling if they are the same. Polarity determining means 34 may be two polarity determiners 36 and 38, which receive signals A' and C, respectively, and output only their polarities, and an exclusive OR gate 40 which receives the signals therefrom.

An absolute value determining means 42 then determines whether the absolute value of the error signal C is increasing or not with time, and outputs a signal F, indicative thereof. Absolute value determining means 42 may be a first signal stripper 44 in parallel with a series combination of discreet delay 46 and a second sign stripper 48. Error signal C passes through both to be received by a comparator 50, which outputs signal F. Signal F is enabling if signal C is increasing with time, and non-enabling if it is not.

An interrupting means 52 is arranged to output an enabling signal G only as long as compensator 10 is armed and the output F from absolute value determining means 42 is nonenabling. Interrupting means 52 may be a first AND gate 54 connected to receive as input both signal F and output from a J-K flip-flop 56, also part of interrupting means 52. The output of first AND gate 54 is connected to the K input of flip-flop 56, which has as its J input signal D from slope ratio determining means 20. Signal G outputs from J-K flip-flop 56. In this way, signal G will become non-enabling as soon as the absolute value of error signal C begins to increase and compensator 10 was previously armed.

Polarity altering means 58 is connected to invert and sustain inverted error signal C when signal E and signal G are enabling, which is when signals A' and C have opposite polarities, B'/A' is less than one, and signal C is not increasing. Polarity altering means 58 may be a second AND gate 60 for receiving the signals and an inverter 62 connected to the output of the second AND gate for altering the polarity in accordance with the output received thereby. Inverter 62 is connected between summer 18 and actuator 14.

Some of the many advantages and novel features of the invention should now be easily apparent. For instance, a compensator has been provided for compensating for the effects of rate saturation of a servomechanism which is used to control the position of a member. The invention is particularly useful in the flight control of an aircraft, where it can reduce the phase lag between change in direction of commands to the flight controls and response by the aircraft. The aircraft will now change directions with the command even under conditions of heavy demand during which the flight actuator becomes saturated. The likelihood of pilot induced oscillations occurring is thereby reduced.

Other embodiments and modifications of the present invention may readily come to those of ordinary skill in the art having the benefit of the teachings presented in the foregoing description and drawings. For instance, the invention can be readily implemented with either analog or digital devices that are well-known in the art. Therefore, it is to be understood that the present invention is not to be limited to such teachings presented, and that such further embodiments and modifications are intended to be included within the scope of the appended claims.

What we claim is:

1. In a flight control servomechanism for driving an actuator to control the position of a member wherein a command signal and a position feedback signal from the member are compared to derive an error signal for controlling the actuator, the improvement comprising:
   means for inverting and sustaining inverted the polarity of the error signal when a ratio of the slope of the plot of the position feedback signal versus time to the slope of the plot of the command signal versus time is less than one and the polarity of the error signal is opposite to the polarity of the slope of the command signal plot, when the absolute value of the error signal is not increasing.

2. The servomechanism of claim 1 wherein said polarity inverting means includes:
   means for determining when the ratio of the slope of the position feedback signal plot to the slope of the command signal plot is less than one and producing a signal indicative thereof;
   means for determining when the polarity of the error signal and the polarity of the slope of the command signal plot are opposite in sign and producing a signal indicative thereof;
   means for determining when the absolute value of the error signal is not increasing and producing a signal indicative thereof; and
   means for altering the polarity of the error signal in accordance with the signals from said ratio determining means, said polarity determining means, and said absolute value determining means.

3. The servomechanism of claim 2 further comprising interrupting means connected to receive the signals from both said ratio determining means and said absolute value determining means for outputting an enabling signal to said polarity altering means only when the received signals so indicate.

4. The servomechanism of claim 3 wherein said ratio determining means includes:
   an operational amplifier arranged to calculate the ratio of the slope of the position feedback signal plot to the slope of the command signal plot; and
   a limiter for determining when the ratio is less than one.

5. The servomechanism of claim 3 wherein said polarity determining means includes an exclusive OR gate having the error signal and the slope of the command signal plot separately connected to the inputs thereof.

6. The servomechanism of claim 3 wherein said interrupting means includes:
   a J-K flip-flop connected at its J input to the signal from said ratio determining means; and
   a first AND gate connected at one input to the signal from said absolute value determining means and at the other input to the output from said J-K flip-flop, the output from said first AND gate being connected to the K input of said J-K flip-flop.

7. The servomechanism of claim 3 wherein said polarity altering means includes:
   a second AND gate connected to receive the signal from said polarity determining means and said interrupting means and to output a signal in accordance therewith; and
   an inverter for switching the polarity of the error signal in accordance with the signal received from said second AND gate.

* * * * *